United States Patent
Nettleship et al.

(10) Patent No.: US 9,911,139 B2
(45) Date of Patent: Mar. 6, 2018

(54) SYSTEM AND METHOD FOR SHARING QUOTES IN A SOCIAL NETWORKING ENVIRONMENT

(71) Applicant: StatusQuote, LLC, Plano, TX (US)

(72) Inventors: Jordan Sloan Nettleship, Plano, TX (US); Michael Urtso, Plano, TX (US)

(73) Assignee: STATUSQUOTE, LLC, Plano, TX (US)

( * ) Notice: Subject to any disclaimer, the term of this patent is extended or adjusted under 35 U.S.C. 154(b) by 366 days.

(21) Appl. No.: 14/665,278

(22) Filed: Mar. 23, 2015

(65) Prior Publication Data

US 2015/0269628 A1  Sep. 24, 2015

Related U.S. Application Data

(60) Provisional application No. 61/969,521, filed on Mar. 24, 2014.

(51) Int. Cl.
| | |
|---|---|
| G06F 15/16 | (2006.01) |
| G06Q 30/02 | (2012.01) |
| H04L 29/06 | (2006.01) |
| G06Q 50/00 | (2012.01) |

(52) U.S. Cl.
CPC ......... *G06Q 30/0269* (2013.01); *G06Q 50/01* (2013.01); *H04L 63/10* (2013.01)

(58) Field of Classification Search
CPC ..... G06Q 30/0269; G06Q 50/01; H04L 63/10
See application file for complete search history.

(56) References Cited

U.S. PATENT DOCUMENTS

| | | | |
|---|---|---|---|
| 9,094,360 B1* | 7/2015 | Bapat | H04L 63/102 |
| 9,436,928 B2* | 9/2016 | Sabur | H04L 51/32 |
| 2008/0189169 A1* | 8/2008 | Turpin | G06Q 30/02 705/7.33 |
| 2013/0055154 A1* | 2/2013 | Sabur | H04L 51/32 715/810 |
| 2013/0232156 A1* | 9/2013 | Dunn | G06F 17/30283 707/752 |
| 2015/0150093 A1* | 5/2015 | Hsieh | H04L 63/08 726/4 |

\* cited by examiner

*Primary Examiner* — John B Walsh
(74) *Attorney, Agent, or Firm* — The Marbury Law Group, PLLC

(57) ABSTRACT

A first computing device operated by a first user of a social networking system sends a quote attributed to a second user of the social networking system to a server device. The server device receives input from a second computing device operated by a second user indicating the consent of the second user to sharing the quote with selected other users of the social networking system. The server device shares the quote with the selected other users of the social networking system in response to receipt of the consent of the second user.

20 Claims, 13 Drawing Sheets

SYSTEM AND METHOD FOR SHARING QUOTES IN A SOCIAL NETWORKING ENVIRONMENT

RELATED APPLICATIONS

This application claims the benefit of priority to U.S. Provisional Application No. 61/969,521, entitled "System And Method For Sharing Quotes In A Social Networking Environment" filed Mar. 24, 2014, the entire contents of which is hereby incorporated by reference for all purposes.

BACKGROUND

In recent years, social networking services and website have grown in popularity and use. Many of these social networking services allow their users to develop relationships (e.g., "friend" relationships) with other users based shared interests, activities, backgrounds, or real-life connections. This is often accomplished by generating a webpage or representation for each user (e.g., a user profile) through which that user may share ideas, pictures, posts, activities, events, and interests with others in their social network.

While these existing social networking services allow their users to share images and text messages, they are not well suited for sharing quotes in a social networking environment. For example, existing solutions do not adequately support the authorization of the publication, attribution, or use of quotes by their users. As such, improved solutions for sharing quotes in a social networking environment will be beneficial to consumers.

SUMMARY

The various embodiments include methods of publishing quotes, which may include receiving in a processor of a computing device a quote and a tag identifier from a first user account associated with a first profile displayed in an electronic display of a first user computing device, querying a database with the tag identifier to identify a second user account associated with a second profile, sending a notification message to the identified second user account, receiving an authorization message that includes information authorizing the publication of the quote from the second user account in response to sending the notification message to the identified second user account, and displaying the quote and a link to the second profile in the first profile in response to receiving the authorization message.

In an embodiment, the method may include displaying the quote and a link to the first profile in the second profile in response to receiving the authorization message. In a further embodiment, the method may include displaying the quote and the link to the second profile in the second profile in a quote feed. In a further embodiment, the method may include receiving an image associated with the quote, in which displaying the quote and the link to the second profile in the first profile in response to receiving the authorization message includes displaying the quote on top of the received image in the first profile.

In a further embodiment, the method may include querying the database with the quote to identify similar quotes, querying the database with the identified similar quotes to identify additional user accounts, analyzing the identified additional user accounts to identify a behavior pattern, selecting an advertisement image based on the identified behavior pattern, and displaying the selected advertisement in at least one of the first profile and second profile.

Further embodiments may include a computing device having means for receiving a quote and a tag identifier from a first user account associated with a first profile displayed in an electronic display of a first user computing device, means for querying a database with the tag identifier to identify a second user account associated with a second profile, means for sending a notification message to the identified second user account, means for receiving an authorization message that includes information authorizing the publication of the quote from the second user account, and means for displaying the quote and a link to the second profile in the first profile in response to receiving the authorization message.

In an embodiment, the computing device may include means for displaying the quote and a link to the first profile in the second profile in response to receiving the authorization message. In a further embodiment, the computing device may include means for displaying the quote and the link to the second profile in the second profile in a quote feed. In a further embodiment, the computing device may include means for receiving an image associated with the quote, in which means for displaying the quote and the link to the second profile in the first profile in response to receiving the authorization message includes means for displaying the quote on top of the received image in the first profile.

In a further embodiment, the computing device may include means for querying the database with the quote to identify similar quotes, means for querying the database with the identified similar quotes to identify additional user accounts, means for analyzing the identified additional user accounts to identify a behavior pattern, means for selecting an advertisement image based on the identified behavior pattern, and means for displaying the selected advertisement in at least one of the first profile and second profile.

Further embodiments may include a computing device having a processor configured with processor-executable instructions to perform operations that include receiving a quote and a tag identifier from a first user account associated with a first profile displayed in an electronic display of a first user computing device, querying a database with the tag identifier to identify a second user account associated with a second profile, sending a notification message to the identified second user account, receiving an authorization message that includes information authorizing the publication of the quote from the second user account in response to sending the notification message to the identified second user account, and displaying the quote and a link to the second profile in the first profile in response to receiving the authorization message.

In an embodiment, the processor may be configured with processor-executable instructions to perform operations that include displaying the quote and a link to the first profile in the second profile in response to receiving the authorization message. In a further embodiment, the processor may be configured with processor-executable instructions to perform operations that include displaying the quote and the link to the second profile in the second profile in a quote feed. In a further embodiment, the processor may be configured with processor-executable instructions to perform operations that include receiving an image associated with the quote. In a further embodiment, the processor may be configured with processor-executable instructions to perform operations such that displaying the quote and the link to the second profile in the first profile in response to receiving the authorization message includes displaying the quote on top of the received image in the first profile.

In a further embodiment, the processor may be configured with processor-executable instructions to perform operations that include querying the database with the quote to identify similar quotes, querying the database with the identified similar quotes to identify additional user accounts, analyzing the identified additional user accounts to identify a behavior pattern, selecting an advertisement image based on the identified behavior pattern, and displaying the selected advertisement in at least one of the first profile and second profile.

Further embodiments may include non-transitory computer readable storage medium having stored thereon processor-executable software instructions configured to cause a processor to perform operations for publishing quotes, the operations including receiving a quote and a tag identifier from a first user account associated with a first profile displayed in an electronic display of a first user computing device, querying a database with the tag identifier to identify a second user account associated with a second profile, sending a notification message to the identified second user account, receiving an authorization message that includes information authorizing the publication of the quote from the second user account in response to sending the notification message to the identified second user account, and displaying the quote and a link to the second profile in the first profile in response to receiving the authorization message.

In an embodiment, the stored processor-executable software instructions may be configured to cause a processor to perform operations that include displaying the quote and a link to the first profile in the second profile in response to receiving the authorization message. In a further embodiment, the stored processor-executable software instructions may be configured to cause a processor to perform operations that include displaying the quote and the link to the second profile in the second profile in a quote feed. In a further embodiment, the stored processor-executable software instructions may be configured to cause a processor to perform operations that include receiving an image associated with the quote. In a further embodiment, the stored processor-executable software instructions may be configured to cause a processor to perform operations such that displaying the quote and the link to the second profile in the first profile in response to receiving the authorization message includes displaying the quote on top of the received image in the first profile.

In a further embodiment, the stored processor-executable software instructions may be configured to cause a processor to perform operations that include querying the database with the quote to identify similar quotes, querying the database with the identified similar quotes to identify additional user accounts, analyzing the identified additional user accounts to identify a behavior pattern, selecting an advertisement image based on the identified behavior pattern, and displaying the selected advertisement in at least one of the first profile and second profile.

Various embodiments may further include methods of sharing quotes by sending by a first computing device operated by a first user of a social networking system a quote attributed to a second user of the social networking system to a server device, receiving by the server device input from a second computing device operated by a second user indicating the consent of the second user to sharing the quote with selected other users of the social networking system, and sharing by the server device the quote with the selected other users of the social networking system in response to receipt of the consent of the second user.

Further embodiments may include a computing device having a processor configured with processor-executable instructions to perform the operations of the methods discussed above.

Further embodiments may include a computing device having means for performing functions of the operations of the methods discussed above.

Further embodiments may include a non-transitory processor-readable storage medium having stored thereon processor-executable instructions to cause a processor to perform operations of the methods discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
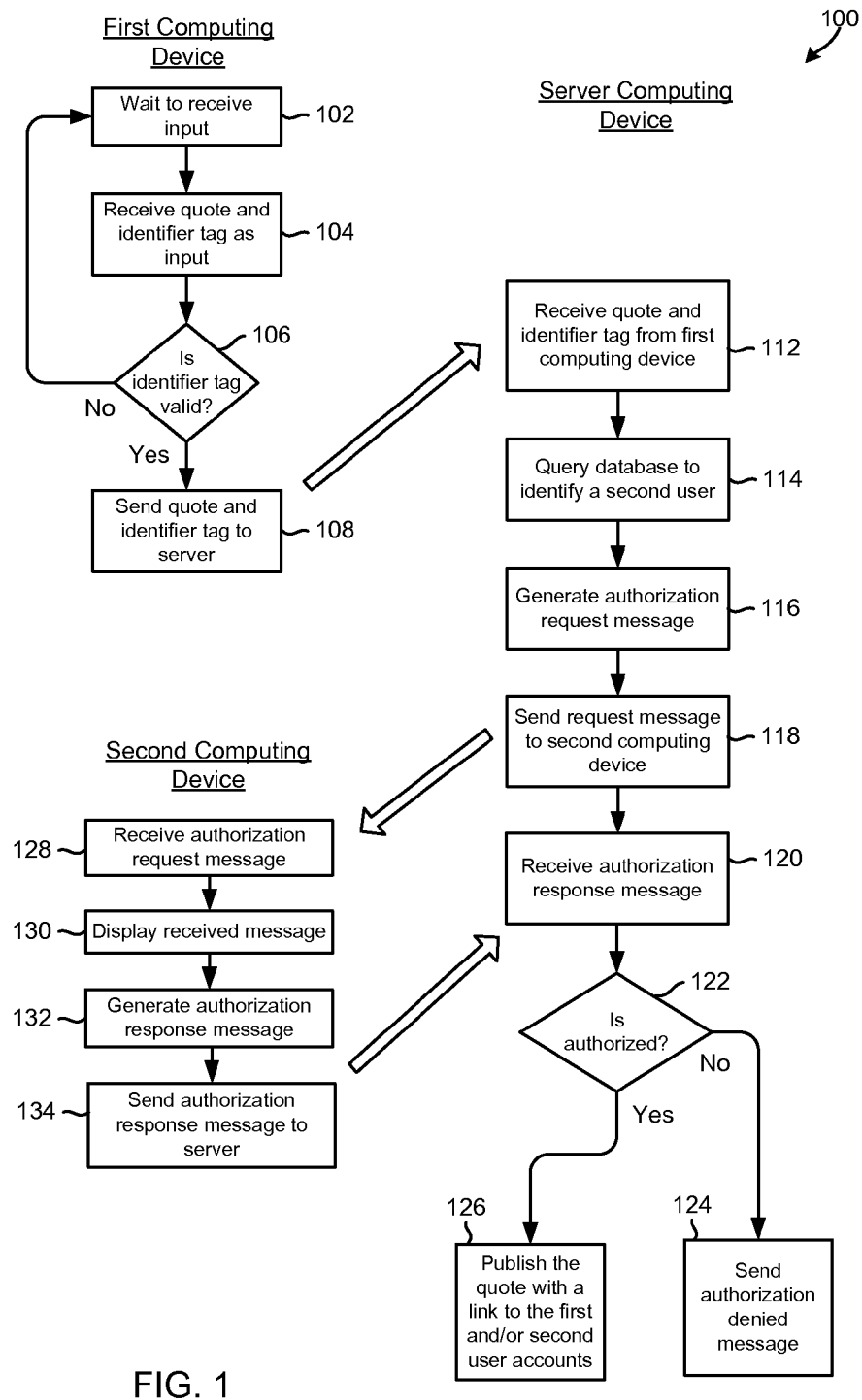
FIG. 1 is a flow diagram illustrating a system method of authorizing and publishing quotes in accordance with an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used generically herein to refer to any one or all of servers, personal computers, mobile devices, cellular telephones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar electronic devices that include a programmable processor. While the various embodiments are particularly useful in smartphones that can download and execute apps, the embodiments are generally useful in any computing device that includes a programmable processor and communications circuitry suitable for sending and receiving information.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. As such, both an application running on a computing device and the computing device may be referred to as a component. Further, one or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

In recent years, social networking services and website have grown in popularity and usage. Many of these social networking services allow their users to develop relationships (e.g., "friend" relationships) with other users based shared interests, activities, backgrounds, or real-life connections. This is often accomplished by generating a webpage or representation for each user (e.g., a user profile) through which that user may share ideas, pictures, posts, activities, events, and interests with others in their social network. For example, Twitter® an online social networking service that enables its users to communicate via text messages that are limited to 140 characters (called tweets). Users post these text messages (tweets) to their profile page, and other users who have previously established a relationship with that user (e.g., by subscribing to "follow" that account) may access the user's profile page and read these posts. Further, since each user may have many such relationships, the user may choose to follow many users/accounts via a news feed linked to the subscriber's profile page. This allows the user to receive and view text messages from many different users in a single page.

While these existing social networking services allow their users to share images and text messages, they are not well suited for sharing quotes or authorizing the publication, attribution, or use of quotes. For example, these existing solutions do not allow a quoted user to prevent the publication of the quote to a quoting user's profile page. To the contrary, these solutions often post/display any information that is input by the user to that user's profile page. For this and other reasons, existing social networking services are not well suited for use in sharing quotes in a social networking environment.

The various embodiments include methods, and computing devices (e.g., server computing devices, etc.) configured with processor executable instructions to implement the methods, of publishing and sharing quotes in a social networking environment so as to overcome many of the limitations of existing solutions. In an embodiment, a server computing device may be configured receive text input in the form of a quote, receive a tag identifier from a first user account associated with a first profile (or from a first computing device), query a database with the tag identifier to identify a second user account associated with a second profile, and send an authorization request message to the identified second user account (or to a second computing device) to request authorization to publish, attribute, and/or use the quote in association with the second user.

The server computing device may receive an authorization response message in response to sending the authorization request message to the identified second user account (or second computing device). The server computing device may prevent the publication of the quote in the first profile when the authorization response message includes information denying permission to publish, attribute, and/or use the use of the quote in association with the second user. On the other hand, the server computing device may publish/display the quote, a link to the second profile, links to other users mentioned by the quote, a photo, etc. in the first profile in response to receiving an authorization response message granting authorization to publish, attribute, and/or use of the quote in association with the second user. The server computing device may also publish/display the quote (and other information) in the second profile, the profiles of mentioned users, and/or in one or more quote feeds.

In an embodiment, the server computing device may be configured to receive a quote object, which may be an information structure that includes a combination of written text and an image. In another embodiment, the server computing device may receive an image associated with the text quote, and superimpose, layer, or overlay the received text and image to generate a combined object or structure that includes a combination of the image and text. This may be accomplished via the server computing device applying any of a number of image processing or layering techniques known in the art. The server computing device may then publish the combined image and text as a quote to one more user profile pages.

In an embodiment, the server computing device may be configured to query a database with the quote to identify quote that are similar to the entered/posted quote. The server computing device may query the same or different database with the identified "similar quotes" to identify additional user accounts. The server computing device may then use pattern recognition, machine learning, and other similar techniques to analyze the identified additional user accounts, the interests and activities of the users associated with those accounts, and other similar information to identify behavior patterns that characterize those users. The server computing device may then use the behavior patterns to determine the interests and activities of the user that entered the quote, the quoted user, and/or mentioned users, and select an advertisement (e.g., image, banner, text, code, etc.) based on the determined interests and activities. The server computing device may send the selected advertisement to the various user devices, or post/display the selected the advertisement in the user profiles of the various users. In this manner, the system may be able to display targeted advertisements that focus on the specific interests and activities of the targeted users.

Internet sites may provide systems and methods for creating and managing relationships (such as "friend" relationships) among users in a social networking environment. These sites use a variety of different mechanisms for providing the relationships between users.

In one typical configuration, users may search for other users of the site using a search function, a browse function, or through the site recommending users who may be of interest to the user accessing the site. The user then requests that a "friend" relationship be established. The request is formatted and transmitted to the other user. If approval of the request is received from the other user, then a "friend" relationship is established, and the relationship is stored in the database. This relationship may be used to format various news feeds or notifications of activity of the related user or to allow access to certain information, which may be restricted to users with whom such a relationship exists. In some instances, a relationship may also be presumed to exist between the user and friends of friends.

In another common configuration, users may search for other users of interest using a search function, a browse function, or through the site recommending users who may be of interest to the user accessing the site, as with the previous example. The user then requests to "follow" the other user. This request may be dependent upon approval of the other user or may be automatically approved. The "follower" relationship is then stored in the database. This relationship may be used to format various news feeds or notifications of activity of the related user or to allow access to certain information, which may be restricted to users with whom such a relationship exists.

In another common configuration, users may search for other users of interest using a search function, a browse function, or through the site recommending users who may be of interest to the user accessing the site, as with the other examples. The user may then indicate that the other user is a "favorite." This "favorite" relationship is then stored in the database. This relationship may be used to format various news feeds or notifications of activity of the related user or to allow access to certain information, which may be restricted to users with whom such a relationship exists.

In yet another configuration, users may search for "groups" of users of interest using a search function, a browse function, or through the site recommending users who may be of interest to the user accessing the site. The user may then request to join the "group." This request may be dependent upon approval of some other user (such as a group moderator or member) or may be automatically approved. Upon approval or upon request, the user is then added to a list of users who are members of that group. This relationship may be used to format various news feeds or notifications of activity of the group or to allow access to certain information, which may be restricted to users with whom such a relationship exists.

A user may decide to share information that is about that user. However, when a user decides to share information about another user, such as, for example, a quote attributed to the other user, the other user may find the sharing of the quote embarrassing. The attribution of the quote to the other user may be in error, the quote may be inaccurate, or the other user may simply regret the uttered words.

FIG. 1 illustrates an embodiment system method 100 of sharing quotes in a social networking system. System method 100 may be performed by one or more processing cores in one or more computing devices. In the example illustrated in FIG. 1, system method 100 is performed by a first computing device, a second computing device, and a server computing device.

In block 102, the first computing device may render an input screen and wait to receive input (e.g., text input, voice input, etc.) from a user of the social networking system. In block 104, the first computing device may receive input from a first user (the "quoting user") of the social networking system. The input may include a quote and an identifier tag. The quote may include written text of a statement made by a second user of the social networking system. The identifier tag may include information that associates the quote to another user of the social networking system and/or information identifying a second user as the person who made the statement included in the quote.

In optional determination block 106, the first computing device may determine whether the identifier tag is valid. For example, the first computing device may query a database to determine whether the identifier tag identifies a valid user account linked to the first user account (i.e., an account of user with which the first user has previously established an online friend relationship, etc). In response to determining that the identifier tag is not valid (i.e., determination block 106="No"), the first computing device may display an error notification message and wait to receive other or additional input in block 102. In response to determining that the identifier tag is valid (i.e., determination block 106="Yes"), in block 110, the first computing device may send the quote and identifier tag to the server computing device. It should be understood that, in an embodiment, the first computing device may be configured to perform the operations of block 110 after receiving the input in block 104 and without first validating the identifier tag in optional determination block 106.

In block 112, the server computing device may receive the quote and tag identifier from the first computing device (e.g., via a first user account or a first profile associated with the first user). In block 114, the server computing device may use the tag identifier to query a database and identify a second user of the social networking system (e.g., by identifying a second user account, a second profile, etc.). For example, in block 114, the server may query a database that stores user-profile identifiers of the members of the social networking system, and use the results of the query to identify the user account of a second user to which the quote may be attributed. Also in block 114, the server computing device may use the results of the query to identify the second computing device that is associated with the second user and/or to identify a profile page of the second user.

In block 116, the server computing device may generate an authorization request message that includes information suitable for requesting permission to publish, attribute, and/or use the quote in association with the second user. For example, the authorization request message may include the quote and a user identifier of the first user. In block 118, the server computing device may send the generated authorization request message to the second computing device. In the various embodiments, sending the authorization request message to the second computing device may include adding a message to an inbox associated with the second user account, displaying a message in a private portion of the second user's profile page, sending an email, SMS message, a data packet, or a communication signal to the second computing device, etc.

In block 128, the second computing device may receive the authorization request message sent from the server computing device. In block 130, the second computing device may display a prompt or message requesting permission to publish, attribute, and/or use the quote in association with the second user. In an embodiment, the second computing device may be configured to automatically request permission to publish, attribute, and/or use the quote in response to receiving the authorization request message. In block 132, the second computing device may receive user input granting or denying the permissions, and generate an authorization response message that includes information suitable for use by the server computing device in determining whether the second user granted or denied permission. In block 134, the second computing device may send the generated authorization response message to the server computing device.

In block 120, the server computing device may receive an authorization response message from the second computing device. In determination block 122, the server computing device may determine whether the authorization response message includes information granting permission for the publication, attribution, and/or use of the quote in association with the second/quoted user. In response to determining that the second/quoted user denied permission to publish, attribute, and/or use the quote (i.e., determination block 122="No"), in block 124, the server computing device may notify the first user that his or her request is denied. For example, in block 124, the server computing device send a notification message to the first computing device (e.g., a "request denied message") to cause the first computing device to display a prompt informing the first/quoting user that the second/quoted user denied permission to use the quote. As another example, in block 124, the server computing device may add a message to an inbox associated with the first user account to inform the first user that the request is denied.

In response to determining that the second user granted permission to publish, attribute, and/or use the quote (i.e., determination block 122="Yes"), in block 126 the server computing device may publish the quote and links to the first and second profile pages and in various quote feeds. For example, the server computing device may publish the quote and a link to the second profile page in the first profile page. The server computing device may also publish the quote and a link to the first profile page in the second profile page. The server computing device may further publish the quote and links to the first and second profile pages in one or more quote feeds and/or perform other similar operations to make the quote available to select users of the social network system. In an embodiment, the server computing device may also send communication messages or signals to the first and second computing devices to cause them to render the quote and links on their electronic displays.

Figure 2:
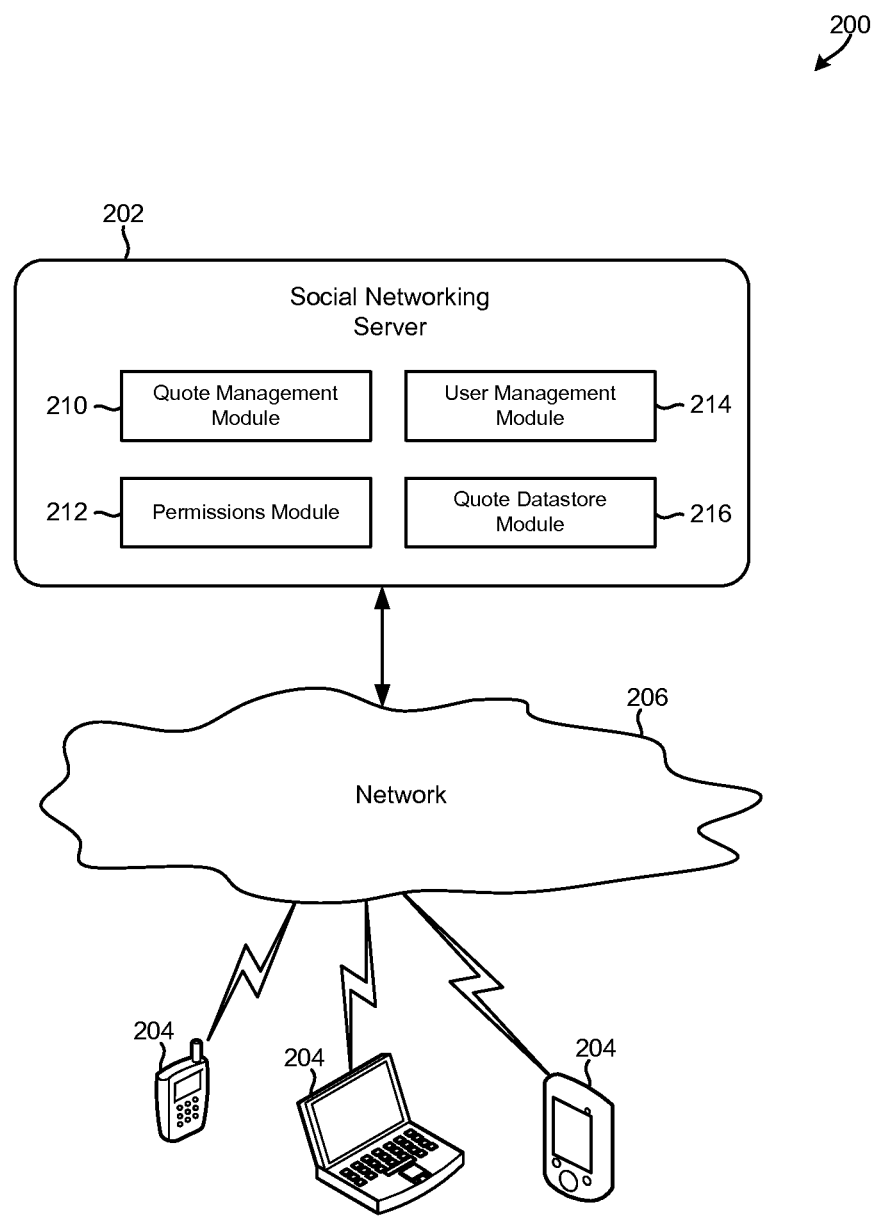
FIG. 2 is a system block diagram illustrating logical and functional components in a social networking system suitable for sharing quotes in accordance with the various embodiments.

FIG. 2 illustrates an example social networking system 200 that is suitable for use for publishing quotes in accordance with the various embodiments. In the example illustrated in FIG. 2, the social networking system 200 includes a social networking server 202, and a plurality of computing devices 204 coupled to the social networking server 202 via a network 206. Communications between the computing devices 204, social networking server 202, the network 206, and the social networking system 200 may be accomplished via wired or wireless communication links, such as 4G, 3G, CDMA, TDMA, LTE and/or other cellular, telephone, Internet-Protocol based communication technologies.

The network 206 may be a wired or wireless local area network (LAN), a telecommunication network, a wireless wide area network (WAN), a proprietary network, the Internet, etc. The social networking server 202 may be a server compuinting device operated by a provider of services that are available to members who have registered with the social networking server. The social networking server 202 may be accessible via a website that allows one or more members to communicate with one another. The website may be open to the public or operated by an entity or institution (e.g., a university, trade group, etc.) for the benefit of members or subscribers of the entity or institution.

Each of the computing devices 204 may include a processor and memory configured to receive and/or execute software applications from an application download server (e.g., an Apple® App Store server, etc.). Each computing device 204 may also include a client application (or "App") that includes processor executable instructions that cause the computing device to accomplish the various functionalities described herein, such as sending and receiving information to and from the social networking server 202.

The social networking server 202 may include various modules or functional elements that provide communications with the computing devices 204 via the network 206 and/or which are suitable for causing the computing devices 204 to perform the various functions and operations discussed herein. For example, in the example illustrated in FIG. 2, the social networking server 202 includes a quote management module 210, a permissions module 212, a user management module, and a quote datastore module 216. Each of these modules 210-216 may be implemented in software, hardware, or any combination thereof. For example, one or more of the modules 210-216 may be implemented as software instructions executing on one or more processing cores in a server computing device.

The user management module 214 may be configured to manage user accounts, such as by maintaining a list of registered users and their relationships with other users. Each user account may be an information structure that includes information identifying a user's private information, message inbox, and/or relationships with other users. The quote management module 210 may be configured to receive, monitor, and manage the quotes, images, and tag identifiers. The quote management module 210 may query a database to obtain identifying information of a quoted user from a tag identifier associated with an uploaded quote. The quote management module 210 may communicate the identifying information to a permissions module 212, which may use the identifying information to obtain authorization/permission from the quoted user to share the quote attributed to the quoted user. For example, the permissions module 224 may generate an authentication request message that includes a quote and an identifier of a quoting user, and then send the generated authentication request message to the client App in the computing device 204 of the quoted user. In an embodiment, the permissions module 224 may be configured to request authorization/permission from the user to use the quote via a web interface (not illustrated).

The computing device 204 may be configured to receive user input from quoted user, and determine whether the quoted user grants permission to share the quote. In an embodiment, the computing device 204 may also receive input identifying a reason for declining the permission request (e.g., statement was not made by the quoted user, statement was made in private and not intended to be shared with others, etc.). The computing device 204 may generate an authentication response message that includes the user input, and send the generated response message to the social networking server 202.

The permissions module 212 in the social networking server 202 may be configured to receive authentication response messages from the computing devices 204, and determine whether a user authorized the use of a quote. The permissions module 212 may generate and send various notification messages informing the computing devices 204 whether the request to share the quote has been granted or denied. The permissions module 212 may also communicate this information to the quote management module 210, which may add the quote to various quote feeds, user profile pages, and the quote datastore.

In addition to uploading the written text of a quote, a computing device 204 may also upload a picture, provide hashtags, geotags, and/or tag multiple users to that quote. This allows individuals to capture additional information regarding the quote, such as other users mentioned in the quote, when the statement was made, where the statement was made, whether the statement was humorous, important, wise, or trivial, etc. This additional information may also allow the users to better search for quotes tagged by other users of the application and follow/subscribe to those users. In addition, this additional information may be used to better identify the characteristics, interests, and activities when selecting targeted advertisements. In an embodiment, this additional information may be included in the same quote object (e.g., same data structure, record, communication message, transmission, transaction, etc.) as the written text. In an embodiment a quote object may include multiple objects, such as a text object, an image object, a location object, etc.

Figure 3:
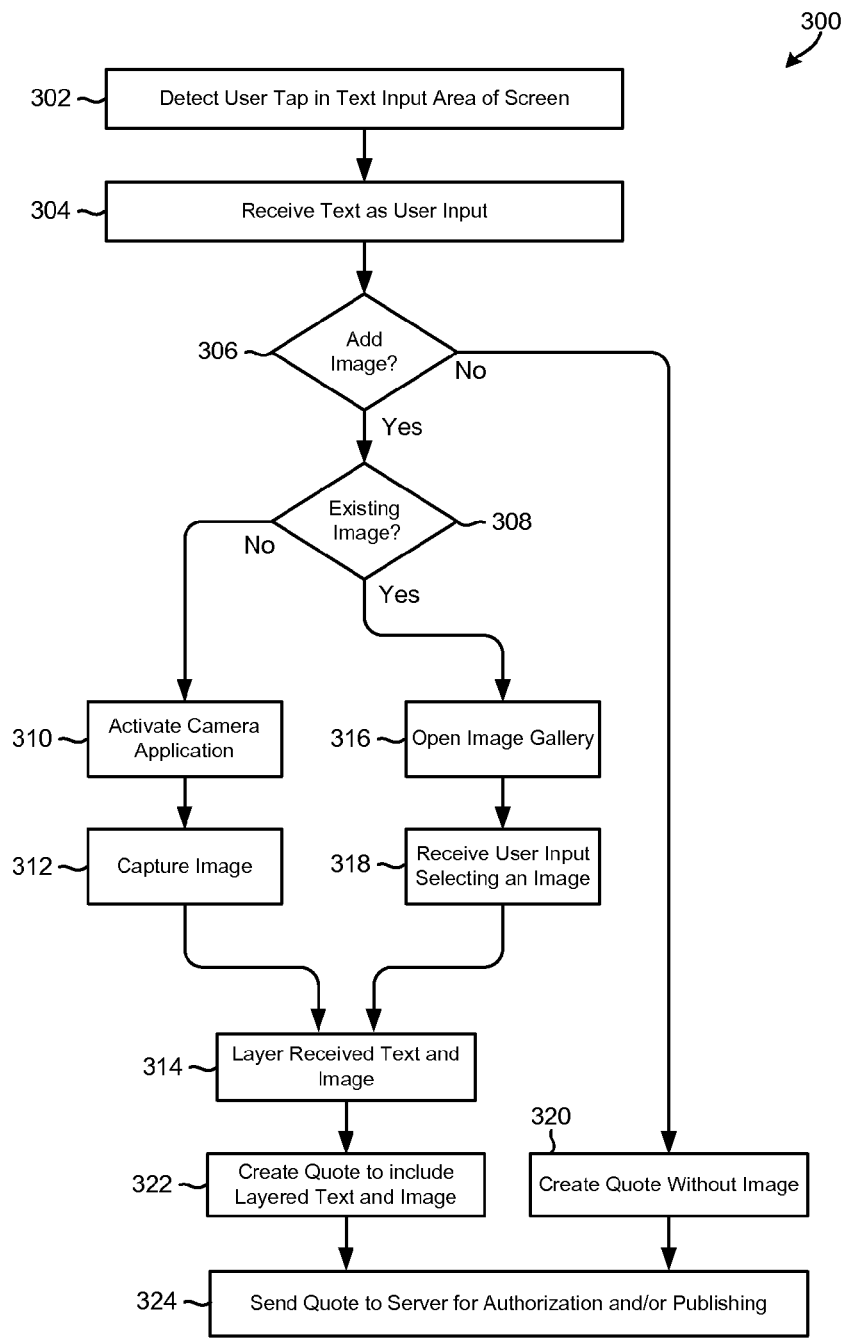
FIG. 3 is a process flow diagram illustrating a method of sharing quotes in a social networking environment in accordance with an embodiment.

FIG. 3 illustrates a method 300 of sharing quotes in a social networking environment in accordance with an embodiment. Method 300 may be performed in a processing core of a computing device.

In block 302, the processing core in the computing device may detect a user tap input in a text input area that is rendered on an electronic display of the computing device. In block 304, the computing device may receive written text in the form of a quote from the text input area.

In determination block 306, the computing device may prompt the user and determine whether the user intends to couple an image to the written text of the quote. In response to determining that the user does not intend to couple an image to the written text of the quote (i.e., determination block 306="No"), in block 320, the computing device may create a quote object that includes the written text and does not include an image. In response to determining that the user does intend to couple an image to the written text of the quote (i.e., determination block 306="Yes"), in determination block 308, the computing device may prompt the user and determine whether the user intends to couple an existing image to the written text of the quote.

In response to determining that the user does not intend to couple an existing image to the written text of the quote (i.e., determination block 308="No"), in block 310, the computing device may activate a camera and/or a camera software application of the computing device. In block 312, the computing device may use the camera and/or camera software application to capture an image. In block 314, the computing device may superimpose or layer the captured image with the received written text. This may be accomplished using any of a number of image layering techniques or technologies known in the art. In block 322, the computing device may create a quote object that includes the combined or layered written text and image. In block 324, the computing device may send the quote object to a server for authorization and/or publishing.

In response to determining that the user does intends to couple an existing image to the written text of the quote (i.e., determination block 308="Yes"), in block 316, the computing device may open or access an image gallery of the computing device and display the images stored in the image gallery for user selection. In various embodiments, the image gallery may include images that are stored in a memory of the computing device, stored in a remote server, or a combination thereof. In block 318, the computing device may receive user input selecting one of the images in the image gallery. In block 314, the computing device may layer the selected image with the received written text. In block 322, the computing device may create a quote object that includes the combined or layered written text and image. In block 324, the computing device may send the quote object to a server for authorization and/or publishing.

Figure 4:
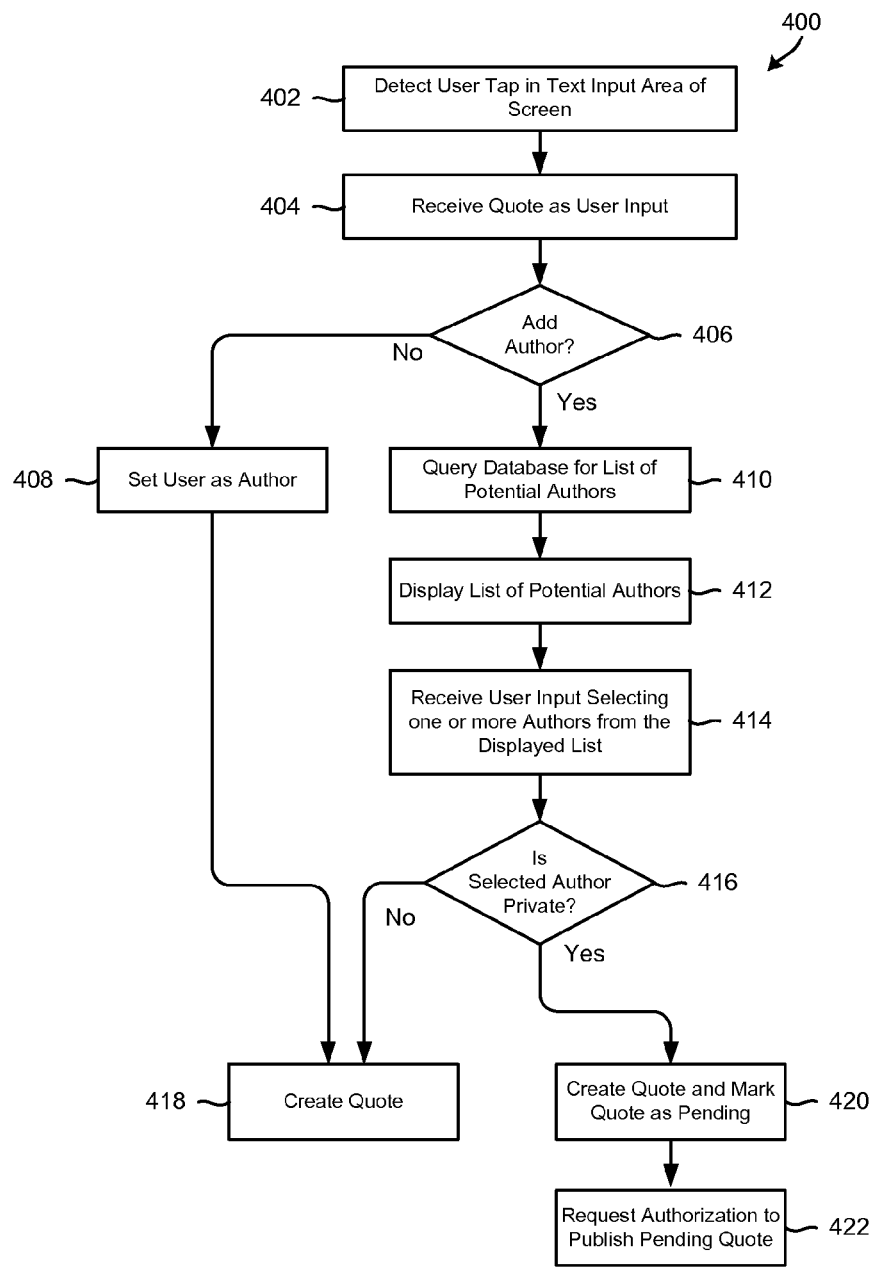
FIG. 4 is a process flow diagram illustrating a method of sharing quotes in a social networking environment in accordance with another embodiment.

FIG. 4 illustrates a method 400 of sharing quotes in a social networking environment in accordance with another embodiment. Method 400 may be performed in a processing core of a computing device.

In block 402, the processing core in the computing device may detect a user tap input in a text input area that is rendered on an electronic display of the computing device. In block 404, the computing device may receive written text in the form of a quote from the text input area. In determination block 406, the computing device may prompt the user and determine whether the user intends to add an author for the quote to associate the written text with other users of the social networking system. In response to determining that the user does not intend to add an author for the quote (i.e., determination block 406="No"), in block 408, the computing device may set the user as the author, such as by associating the tag identifier of the user with the text. In block 418, the computing device may create a quote object that includes the written text and the associated tag identifier.

In response to determining that the user intends to add an author for the quote (i.e., determination block 406="Yes"), in block 410, the computing device may query a local or remote database to generate a list of potential authors. This list of potential authors may include other users of the social networking system that are friends of the user, that the user is following, that are following the user, that are in close physical proximity to the user, etc. In block 412, the computing device may display the list of potential authors in an electronic display of the computing device. In block 414, the computing device may receive user input selecting one or more authors from the displayed list of authors.

In determination block 416, the computing device may determine whether any of the selected authors are private users. This may be accomplished by querying a local or remote database to access user account and configuration information of the selected authors, etc. In response to determining that none of the selected users are private users (i.e., determination block 416="No"), in block 418, the computing device may generate a quote object that includes the received written text and a tag identifier for each of the selected authors. In response to determining that at least one of the selected users are private users (i.e., determination block 416="Yes"), in block 420, the computing device may generate a quote object that includes the received written text, tag identifier of the selected authors, and information identifying the quote as pending and/or requiring authorization from the identified private authors. In block 422, the computing device may request authorization to publish the pending quote, such as by requesting that a server in the social networking system send an authorization request message to the private author.

Figure 5:
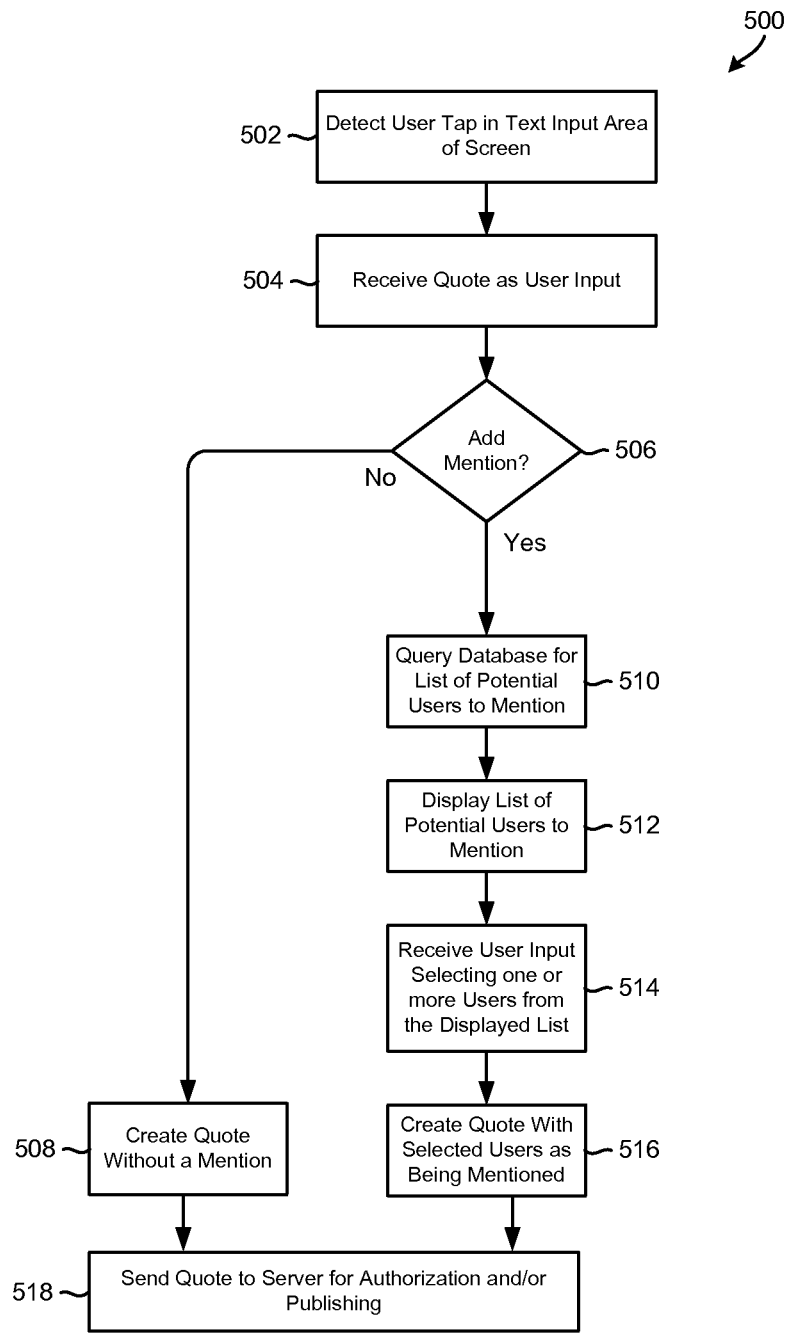
FIG. 5 is a process flow diagram illustrating a method of sharing quotes in a social networking environment in accordance with yet another embodiment.

FIG. 5 illustrates a method 500 of sharing quotes in a social networking environment in accordance with yet another embodiment. Method 500 may be performed in a processing core of a computing device.

In block 502, the processing core in the computing device may detect a user tap input in a text input area that is rendered on an electronic display of the computing device. In block 504, the computing device may receive written text in the form of a quote from the text input area. In determination block 506, the computing device may prompt the user and determine whether the user intends to add a mention for the quote to associate the written text with another user of the social networking system. In response to determining that the user does not intend to add a mention for the quote (i.e., determination block 508="No"), in block 508, the computing device may generate a quote object that does not include any mentions. For example, in block 508, the computing device may create the quote so that it does not associate the written text with a tag identifier of any user other than the author. In block 518, the computing device may send the quote object to a server for authorization and/or publishing.

In response to determining that the user intends to add a mention for the quote (i.e., determination block 508="Yes"), in block 510, the computing device may query a local or remote database to generate a list of potential mentions. This list of potential mentions may include other users of the social networking system that are friends of the user, that the user is following, that are following the user, that are in close physical proximity to the user, etc. In block 512, the computing device may display the list of potential mention in an electronic display of the computing device. In block 514, the computing device may receive user input selecting one or more users from the displayed list of mentions as being mentioned in the quote. In block 516, the computing device may generate a quote object that includes the received written text and a tag identifier for each of the selected mentions. In block 518, the computing device may send the quote object to a server for authorization and/or publishing.

Figure 6:
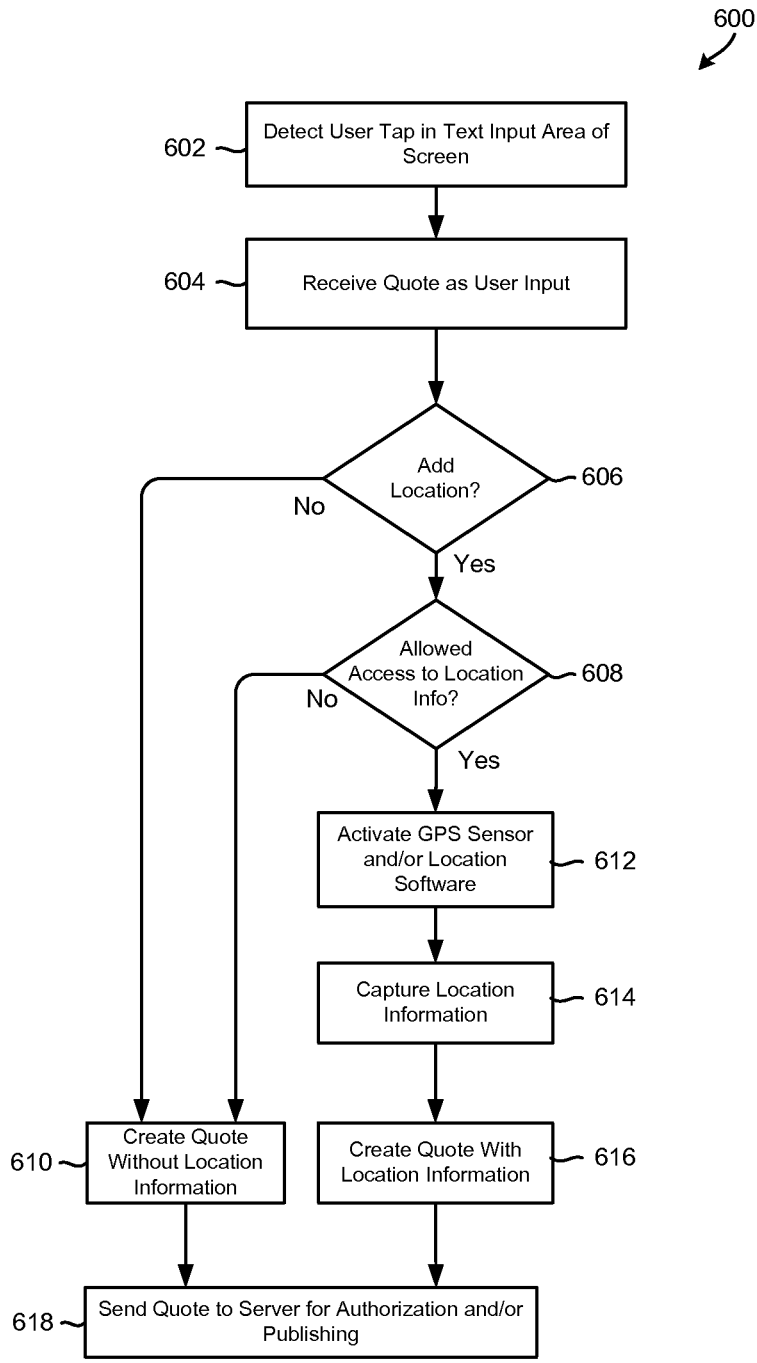
FIG. 6 is a process flow diagram illustrating a method of sharing quotes in a social networking environment in accordance with yet another embodiment.

FIG. 6 illustrates a method 600 of sharing quotes in a social networking environment in accordance with yet another embodiment. Method 600 may be performed in a processing core of a computing device.

In block 602, the processing core in the computing device may detect a user tap input in a text input area that is rendered on an electronic display of the computing device. In block 604, the computing device may receive written text in the form of a quote from the text input area. In determination block 606, the computing device may prompt the user and determine whether the user intends to add a geotag or other location information to the quote. In response to determining that the user does not intend to add location information to the quote (i.e., determination block 606="No"), in block 610, the computing device may create a quote object that does not include location information. In block 618, the computing device may send the quote to a server for authorization and/or publishing.

In response to determining that the user intends to add location information to the quote (i.e., determination block 606="Yes"), in determination block 608, the computing device may determine whether the user or client App has been granted permission to access the location information of the computing device. In response to determining that the user or client App has not been granted permission to access the location information of the computing device (i.e., determination block 608="No"), in block 610, the computing device may create a quote object that does not include location information, and send the quote to a server for authorization and/or publishing in block 618.

In response to determining that the user or client App has been granted permission to access the location information of the computing device (i.e., determination block 608="Yes"), in block 612, the computing device may activate a global positioning system sensor and/or location software. In block 614, the computing device may capture location information from the activated sensor or location software. The location information may identify the current geo-spatial location of the computing device, a location in which the statement of the written text was uttered or captured, etc. In block 616, the computing device may create the quote object to include the written text and the location information. In block 618, the computing device may send the quote to a server for authorization and/or publishing.

Figure 7:
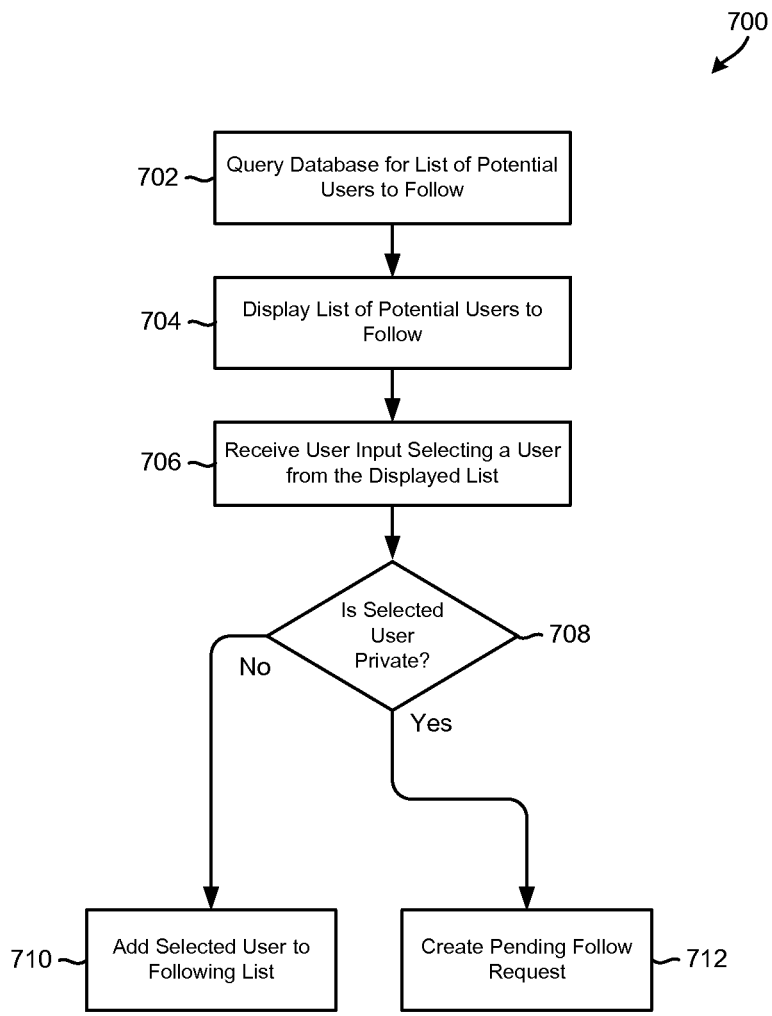
FIG. 7 is a process flow diagram illustrating a method of updating a friend or following list to include additional users of the social networking system in accordance with an embodiment.

FIG. 7 illustrates a method 700 of updating a friend or following list to include additional users of the social networking system in accordance with an embodiment. Method 700 may be performed in a processing core of a computing device, such as a server computing device or a mobile computing device.

In block 702, the computing device may query a database to receive a list of potential users to follow. The list of potential users may include other users of the social networking system that are determined to have a shared interest, activity, or friend as the user of the computing device. The list of potential users may also include other users that are in close physical proximity to the user, other users that have posted quotes that are similar to the quotes posted by the user, other users that have quoted the same author as the user, etc. In an embodiment, the list of potential users may be generated by searching through friends and contacts in third party software applications (e.g., Facebook®, Twitter®, Instagram®, etc.).

In block 704, the computing device may display the list of potential user in an electronic display of the computing device. In block 706, the computing device may receive user input selecting a user in the displayed list. In determination block 708, the computing device may determine whether the selected user is a private user. In response to determining that the selected user is not a private user (i.e., determination block 708="No"), in block 710, the computing device may add the selected user to the friend or following list of the user. In response to determining that the selected user is a private user (i.e., determination block 708="Yes"), in block 712, the computing device generate a pending follow request, which may be sent to the determined private user to request his/her permission to add them to the friend/following list.

Figure 8:
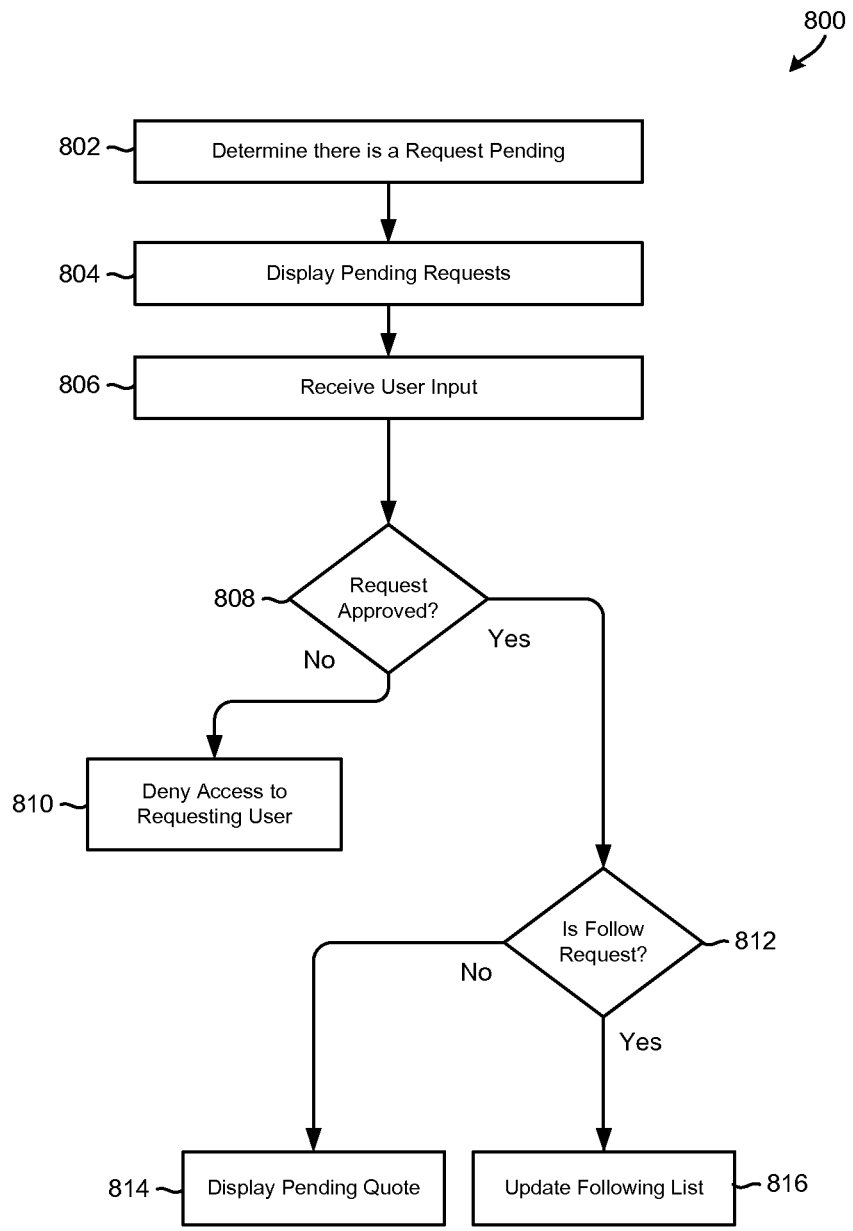
FIG. 8 is a process flow diagram illustrating a method of managing requests in accordance with an embodiment.

FIG. 8 illustrates a method 800 of managing requests in accordance with an embodiment. Method 800 may be performed in a processing core of a computing device.

In block 802, the computing device may determine that there are requests pending. For example, the computing device may determine that it has received a request message, such as an authorization request message or a follow request message, from another user of the social networking system. In block 804, the computing device may display a list of pending request in an electronic display of the computing device. In block 806, the computing device may receive user input authorizing or denying the request message. In determination block 808, the computing device may use the received user input to determine whether the request was approved. In response to determining that the request was not approved (i.e., determination block 808="No"), in block 810, the computing device may deny access to the requesting user, such as by discarding a quote, not rendering content, limiting the user profile of the requesting user, etc. In response to determining that the request was approved (i.e., determination block 808="Yes"), in determination block 812, the computing device may determine whether the approved request is a follow request.

In response to determining the approved request is not a follow request (i.e., determination block 812="No"), in block 814, the computing device may determine that the approved request is an authorization request and display a quote for user approval. In response to determining the approved request is a follow request (i.e., determination block 812="Yes"), in block 816, the computing device may add a requesting user to a following list.

Figure 9:
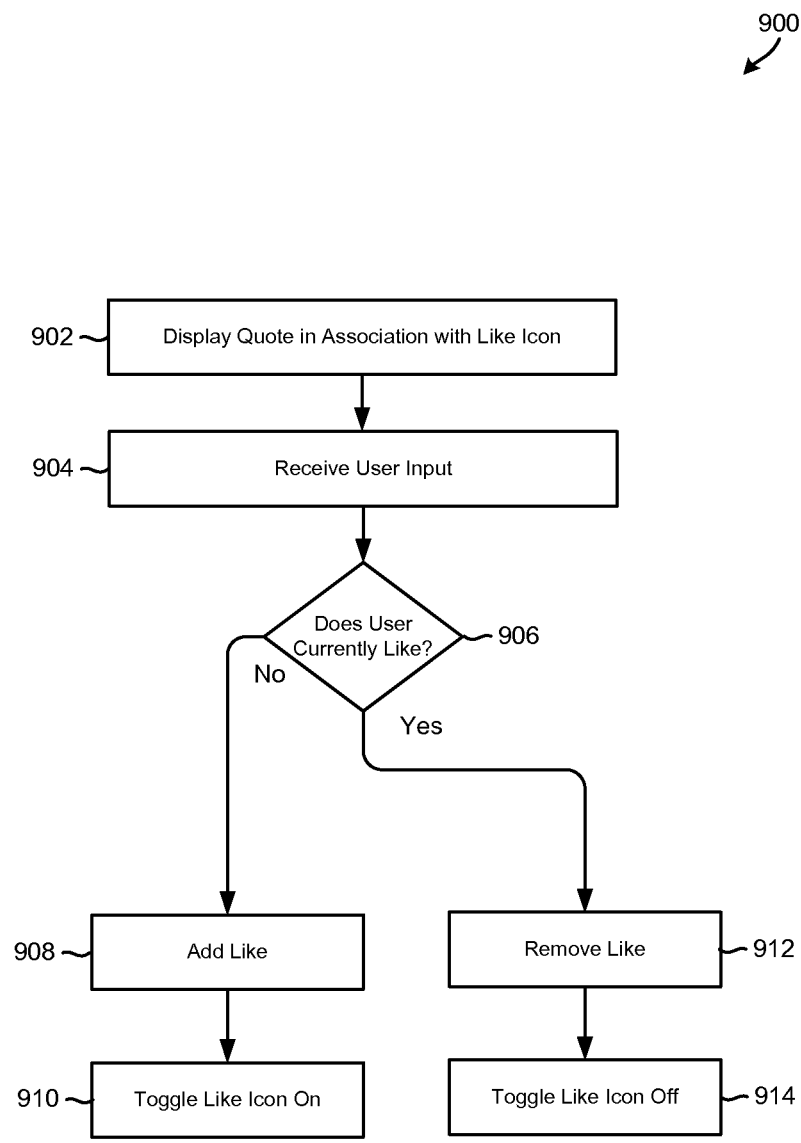
FIG. 9 is a process flow diagram illustrating an embodiment method of displaying a quote in association with a like icon so as to capture user information that may be used to determine the interests and activities of the users.

FIG. 9 illustrates an embodiment method 900 of displaying a quote in association with a like icon so as to capture user information that may be used to determine the interests and activities of the users. Method 900 may be performed in a processing core of a computing device.

In block 902, the computing device may display a quote in association with a like icon. In block 904, the computing device may receive user input from like icon button indicating that the like icon was pressed or actuated. In determination block 906, the computing device may determine whether the user currently "likes" the displayed quote. For example, the computing device may determine whether the user has previously pressed the like icon for that quote, which may be determined by access the user's account or profile information.

In response to determining that the user does not currently "like" the displayed quote (i.e., determination block 906="No"), in block 908, the computing device may update the user's account or profile information to indicate that the user "likes" the quote. In block 910, the computing device may toggle the like icon "on," such as by changing the appearance or color of the icon.

In response to determining that the user currently "likes" the displayed quote (i.e., determination block 906="Yes"), in block 912, the computing device may update the user's account or profile information to indicate that the user does not "like" the quote. In an aspect, this may be accomplished by deleting information that indicates that the user "likes" the quote from the user's account or profile. In block 914, the computing device may toggle the like icon "off," such as by changing the appearance or color of the icon.

Figure 10:
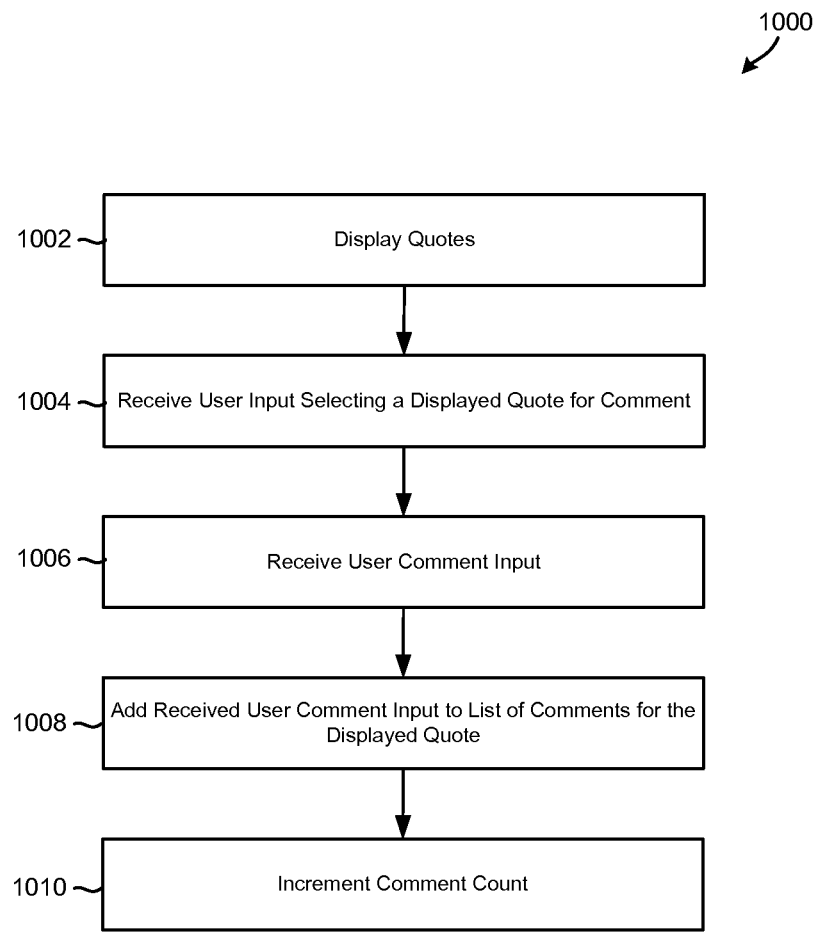
FIG. 10 is a process flow diagram illustrating a method of displaying a quote in association with user comments in accordance with an embodiment.

FIG. 10 illustrates a method 1000 of displaying a quote in association with user comments in accordance with an embodiment. Method 1000 may be performed in a processing core of a computing device.

In block 1002, the computing device may display a list of quotes. In block 1004, the computing device may receive user input selecting a displayed quote for comment. In block 1006, the computing device may receive user input in the form of a comment. The user comment input may include text, images, links, etc. In block 1008, the computing device may add the user comment input to a list of comments that are stored and/or displayed in association with the selected quote. In block 1010, the computing device may increment a comment count value, which may be used to capture user information that may be used to determine the popularly of the quote and/or the interests and activities of various users (e.g., the user that posted the quote, the users that commented on the quote, etc.).

When a quote has been created, tagged, and shared on a newsfeed to the user's followers/subscribers, viewers may click on the quote in order to comment, share, like/rate, tag, and/or follow that user (if he/she isn't already following or subscribed). The quote datastore module may save comments, ratings, and like and dislike indicators for a quote. A user may view his/her own quotes on his/her own profile. He/she may also explore his/her own quote map, and edit his/her own profile.

In an embodiment, the client App in the computing devices may be configured to provide/render a graphical user interface (GUI) that facilitates interactions between users of a computing device and the social networking server. The GUI may include a welcome page that provides a register option and a sign in option. The register option may direct a new user to a registration form. The user may be prompted to select a username and password, as well as an optional profile image or avatar. The GUI may include, for example, a navigation map that displays the proximity of the user to other users.

In an embodiment, the client App may include components configured to provide software integration with a third party application (e.g., Facebook®). The client App may provide the user the option to use user information from the third parting application to register. Selection of this option may refer the user to a application program interface (API) that prompts the user to sign in with the user's third party credentials if the user is not already signed in. When it is determined that the user is already signed in to the third party application, the API may populate the registration form with information from the user's account with the third party application. When it is determined that the user is already registered, the user may be prompted to sign in with the user username and password. If the user has forgotten the user password, the system may allow the user to retrieve this information by entering the user registered username or email (e.g., the email that the user signed up with).

Once the user is signed in or registered the user may be directed to a main view, which may display a stream of quotes from people the user follows. In an embodiment, the main view may display the username, time of post, image (if available), quote, and how many likes and comments are associated with each quote post. The main view may also display a like button, comment button, and share button associated with each post. The main view may also allow users to navigate to other views or to the profile pages of other users.

The user may select an explore/search view by "clicking" an explore/search button. The explore/search view allows the user to search for friends or others to follow. A simple search box allows the user to search by users or hashtags. The user may also search by people with whom the user is friends on Facebook® or within their device contacts. A search results view displays all available responses from a search query. The user may select a result to receive information about a particular user identified by the search. For example, the user may be provided information about the identified user's posts, followers, other users followed and quotes. The user may click the follow button to follow the identified user.

The user may select a new quote view by "clicking" a new quote button. The new quote view provides the user a space to enter a quote. Once a quote is written, the user may attach a photo, tag one or multiple people, share out to Facebook, Twitter, Foursquare, or email according to the share settings, the geotag settings and the tag settings. Once the sharing locations have been selected, the user may click a share button to post the quote to the user's stream. The user will be routed to the main quote stream after submission. If a user is tagged in a quote, the tagged user will be notified through a push notification requesting permission to associate the quote with the tagged user.

The user may select a popular quotes view by "clicking" a popular quotes button. This view displays the most liked posts from other users that the user follows. The user may select a single quote view to view a particular quote. The single quote view provides the user the option to comment, to share, to express a like or dislike opinion, and to tag the particular quote. The user may also tab over to the news view, which displays an overview of other users that the user follows, what the other users have liked, commented on and who has recently started following the other user. Again, the user may select a particular quote in a single quote view.

The user may select a profile view by "clicking" a profile button. The profile page displays information about the user activity. For example, the profile page may display the quotes that are attributed to the user associated with the profile. A quote map provides a view of the quotes of others shared by the user.

The user may edit the user profile from an edit user profile view. Selecting the edit button drives the user to the application/settings and option view. For example, the user may change a user profile image, a username, a password, biographical information, and personal website information. The profile view is also linked to various settings buttons. For example, the user may set or revise share settings, push notification settings, privacy settings, and TOS settings. The share settings may be used to establish links to Facebook®, Twitter®, Foursquare® and email.

Figure 11:
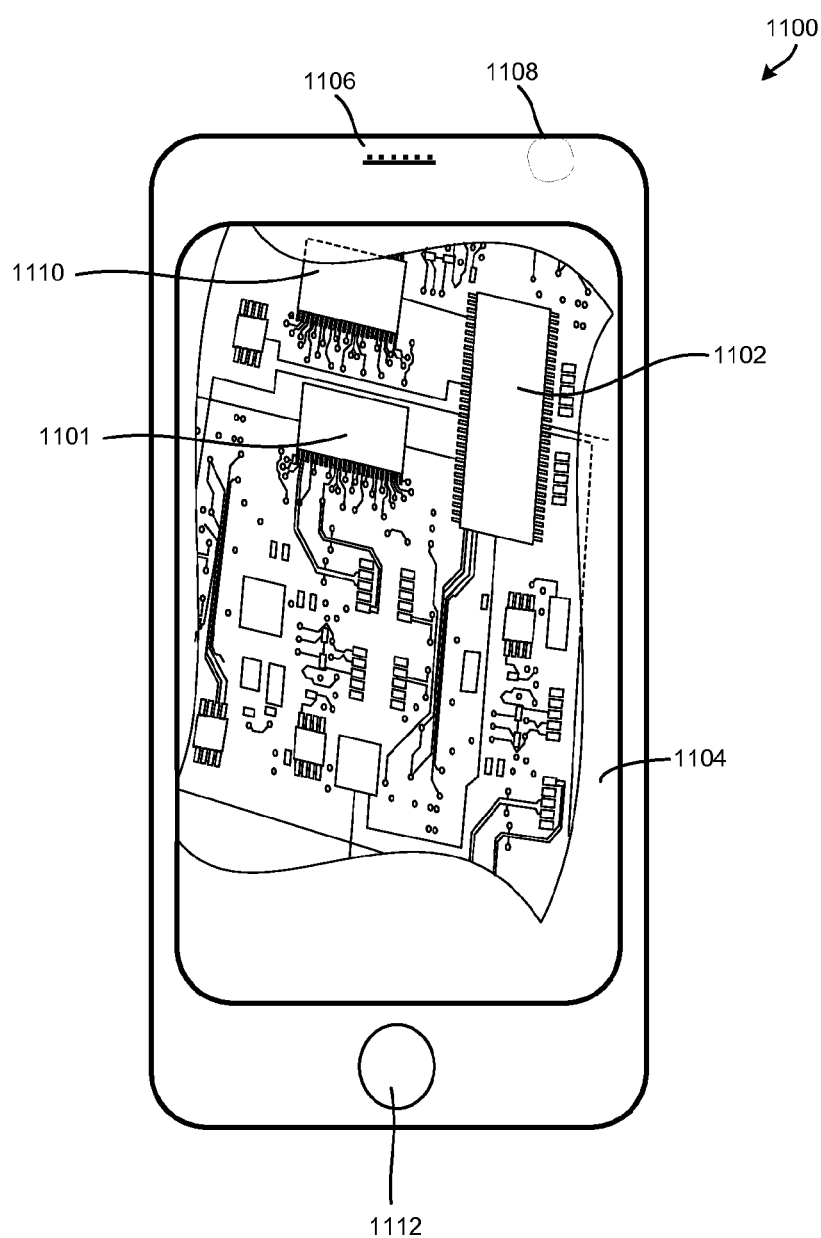
FIG. 11 is a block diagram of a computing device in the form of a smartphone that is suitable for use in implementing various embodiments.

FIG. 11 is a block diagram of a computing device in the form of a smartphone that is suitable for use with any of the embodiments. Such a computing device 1100 typically includes a processor 1101 coupled to an internal memory 1102, an electronic display 1104, and to a speaker 1106. The computing device 1100 may include an antenna 1108 for sending and receiving electromagnetic radiation that may be connected to a wireless data link coupled to the processor 1101. The computing device may also include menu selection buttons or rocker switches 1112 for receiving user inputs.

A typical smartphone computing device 1100 also includes a sound encoding/decoding (CODEC) circuit 1110 which digitizes sound received from a microphone into data packets suitable for wireless transmission, and decodes received sound data packets to generate analog signals that are provided to the speaker 1106 to generate sound. The computing device 1100 may further include a ZigBee transceiver (i.e., an IEEE 802.15.4 transceiver) or other similar communication circuitry (e.g., circuitry implementing the Bluetooth® or WiFi protocols, etc.).

Figure 12:
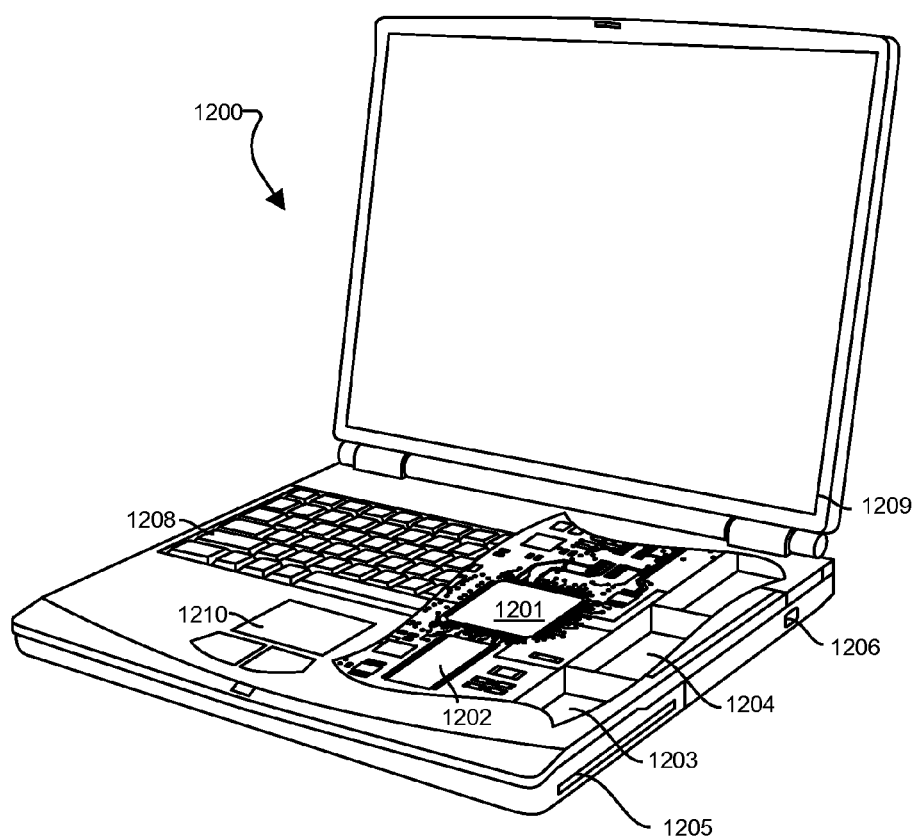
FIG. 12 is a block diagram of a computing device in the form of a laptop that is suitable for use in implementing various embodiments.

FIG. 12 is a block diagram of a computing device in the form of a laptop that suitable for use with any of the embodiments. Such a computing device 1200 typically includes a processor 1201 coupled to volatile memory 1202 and a large capacity nonvolatile memory, such as a disk or solid-state flash drive 1203. Typically, software applications may be stored in the internal memory 1202 before they are accessed and loaded into the processor 1201, including client Apps that facilitate the sharing of quotes in accordance with the various embodiments. The processor 1201 may include internal memory sufficient to store the application software instructions.

In addition, the computing device 1200 may also include a flash drive 1204 and a compact disc (CD) drive 1205 coupled to the processor 1201. Typically, the computing device 1200 will also include a mouse pad 1210 and a keyboard 1208 for receiving user input, and an electronic display 1209 for rendering content. The computing device 1200 may also include a number of connector ports 1206 coupled to the processor 1201 for establishing data connections or network connections or for receiving external memory devices, such as USB or FireWire® connector sockets.

Figure 13:
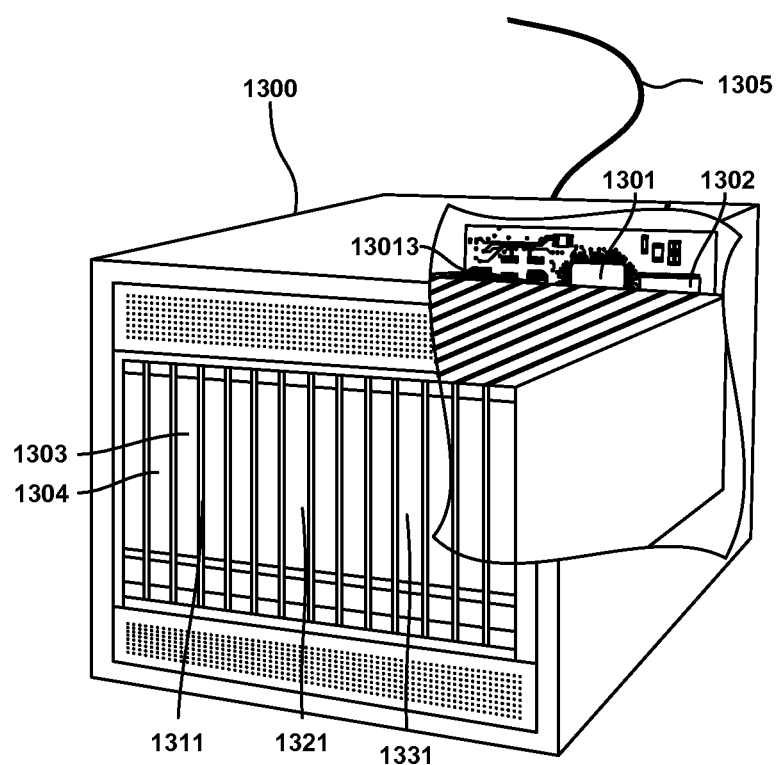
FIG. 13 is a block diagram of a server device suitable for use in implementing various embodiments.

Various embodiments may be implemented on any of a variety of commercially available server computing devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include an external drive, compact disc (CD) or DVD disc drive 1304 coupled to the processor 1301. The server 1300 may also include network access ports 1305 coupled to the processor 1301 for establishing data connections with a network, such as a local area network coupled to other broadcast system computers and servers. The processors 1101, 1201 and 1301 may be any programmable microprocessor, microcomputer or multiple processor chip or chips that can be configured by software instructions (applications) to perform a variety of functions, including the functions of the various embodiments described below. In some computing devices, multiple processors may be provided, such as one processor dedicated to wireless communication functions and one processor dedicated to running other applications. Typically, software applications may be stored in the internal memory 1102, 1202 and 1302 before they are accessed and loaded into the processors 1101, 1201 and 1301. The processors 1101, 1201 and 1301 may include internal memory sufficient to store the application software instructions.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of publishing quotes implemented in a server computing device, comprising:
    receiving, in a processor of the server computing device, a quote and a tag identifier from a first user account associated with a first profile displayed in an electronic display of a first user computing device;
    querying a database with the tag identifier to identify a second user account associated with a second profile;
    sending a notification message to the identified second user account for display in an electronic display of a second user computing device;
    receiving an authorization message from the second user account in response to sending the notification message to the identified second user account, wherein the authorization message received from second user account includes information authorizing the publication of the quote received from the first user account in the first profile; and
    displaying the quote and a link to the second profile in the first profile in response to receiving the authorization message.

2. The method of claim 1, further comprising:
    displaying the quote and a link to the first profile in the second profile in response to receiving the authorization message.

3. The method of claim 1, further comprising:
    displaying the quote and the link to the second profile in the second profile in a quote feed.

4. The method of claim 1, further comprising receiving an image associated with the quote, wherein displaying the quote and the link to the second profile in the first profile in response to receiving the authorization message comprises:
    displaying the quote on top of the received image in the first profile.

5. The method of claim 1, further comprising:
    querying the database with the quote to identify similar quotes;
    querying the database with the identified similar quotes to identify additional user accounts;
    analyzing the identified additional user accounts to identify a behavior pattern;
    selecting an advertisement image based on the identified behavior pattern; and
    displaying the selected advertisement in at least one of the first profile and second profile.

6. A server computing device, comprising:
    means for receiving a quote and a tag identifier from a first user account associated with a first profile displayed in an electronic display of a first user computing device;
    means for querying a database with the tag identifier to identify a second user account associated with a second profile;
    means for sending a notification message to the identified second user account for display in an electronic display of a second user computing device;
    means for receiving an authorization message from the second user account, wherein the authorization message received from second user account includes information authorizing the publication of the quote received from the first user account in the first profile; and
    means for displaying the quote and a link to the second profile in the first profile in response to receiving the authorization message.

7. The server computing device of claim 6, further comprising:
    means for displaying the quote and a link to the first profile in the second profile in response to receiving the authorization message.

8. The server computing device of claim 6, further comprising:
    means for displaying the quote and the link to the second profile in the second profile in a quote feed.

9. The server computing device of claim 6, further comprising means for receiving an image associated with the quote, wherein means for displaying the quote and the link to the second profile in the first profile in response to receiving the authorization message comprises:

means for displaying the quote on top of the received image in the first profile.

10. The server computing device of claim 6, further comprising:
   means for querying the database with the quote to identify similar quotes;
   means for querying the database with the identified similar quotes to identify additional user accounts;
   means for analyzing the identified additional user accounts to identify a behavior pattern;
   means for selecting an advertisement image based on the identified behavior pattern; and
   means for displaying the selected advertisement in at least one of the first profile and second profile.

11. A server computing device, comprising:
   a processor configured with processor-executable instructions to perform operations comprising:
      receiving a quote and a tag identifier from a first user account associated with a first profile displayed in an electronic display of a first user computing device;
      querying a database with the tag identifier to identify a second user account associated with a second profile;
      sending a notification message to the identified second user account for display in an electronic display of a second user computing device;
      receiving an authorization message from the second user account in response to sending the notification message to the identified second user account, wherein the authorization message received from second user account includes information authorizing the publication of the quote received from the first user account in the first profile; and
      displaying the quote and a link to the second profile in the first profile in response to receiving the authorization message.

12. The server computing device of claim 11, wherein the processor is configured with processor-executable instructions to perform operations further comprising:
   displaying the quote and a link to the first profile in the second profile in response to receiving the authorization message.

13. The server computing device of claim 11, wherein the processor is configured with processor-executable instructions to perform operations further comprising:
   displaying the quote and the link to the second profile in the second profile in a quote feed.

14. The server computing device of claim 11, wherein:
   the processor is configured with processor-executable instructions to perform operations further comprising receiving an image associated with the quote; and
   the processor is configured with processor-executable instructions to perform operations such that displaying the quote and the link to the second profile in the first profile in response to receiving the authorization message comprises displaying the quote on top of the received image in the first profile.

15. The server computing device of claim 11, wherein the processor is configured with processor-executable instructions to perform operations further comprising:
   querying the database with the quote to identify similar quotes;
   querying the database with the identified similar quotes to identify additional user accounts;
   analyzing the identified additional user accounts to identify a behavior pattern;
   selecting an advertisement image based on the identified behavior pattern; and
   displaying the selected advertisement in at least one of the first profile and second profile.

16. A non-transitory computer readable storage medium having stored thereon processor-executable software instructions configured to cause a processor to perform operations for publishing quotes, the operations comprising:
   receiving a quote and a tag identifier from a first user account associated with a first profile displayed in an electronic display of a first user computing device;
   querying a database with the tag identifier to identify a second user account associated with a second profile;
   sending a notification message to the identified second user account for display in an electronic display of a second user computing device;
   receiving an authorization message from the second user account in response to sending the notification message to the identified second user account, wherein the authorization message received from second user account includes information authorizing the publication of the quote received from the first user account in the first profile; and
   displaying the quote and a link to the second profile in the first profile in response to receiving the authorization message.

17. The non-transitory computer readable storage medium of claim 16, wherein the stored processor-executable software instructions are configured to cause a processor to perform operations comprising:
   displaying the quote and a link to the first profile in the second profile in response to receiving the authorization message.

18. The non-transitory computer readable storage medium of claim 16, wherein the stored processor-executable software instructions are configured to cause a processor to perform operations comprising:
   displaying the quote and the link to the second profile in the second profile in a quote feed.

19. The non-transitory computer readable storage medium of claim 16, wherein:
   the stored processor-executable software instructions are configured to cause a processor to perform operations comprising receiving an image associated with the quote; and
   the stored processor-executable software instructions are configured to cause a processor to perform operations such that displaying the quote and the link to the second profile in the first profile in response to receiving the authorization message comprises displaying the quote on top of the received image in the first profile.

20. The non-transitory computer readable storage medium of claim 16, wherein the stored processor-executable software instructions are configured to cause a processor to perform operations comprising:
   querying the database with the quote to identify similar quotes;
   querying the database with the identified similar quotes to identify additional user accounts;
   analyzing the identified additional user accounts to identify a behavior pattern;
   selecting an advertisement image based on the identified behavior pattern; and
   displaying the selected advertisement in at least one of the first profile and second profile.

* * * * *